(12) United States Patent
Imura

(10) Patent No.: US 7,248,865 B2
(45) Date of Patent: Jul. 24, 2007

(54) MOBILE COMMUNICATION TERMINAL

(75) Inventor: Yoshiki Imura, Tokyo (JP)

(73) Assignee: NEC Corporation (JP)

( * ) Notice: Subject to any disclaimer, the term of this patent is extended or adjusted under 35 U.S.C. 154(b) by 105 days.

(21) Appl. No.: 10/985,917

(22) Filed: Nov. 12, 2004

(65) Prior Publication Data
US 2005/0107078 A1 May 19, 2005

(30) Foreign Application Priority Data
Nov. 19, 2003 (JP) ............................. 2003/388891

(51) Int. Cl.
E04H 1/00 (2006.01)
(52) U.S. Cl. ...................... 455/421; 455/419; 455/420
(58) Field of Classification Search ................ 455/421, 455/419, 403, 414.1, 412.1, 412.2, 420
See application file for complete search history.

(56) References Cited

U.S. PATENT DOCUMENTS

| 6,151,493 | A | 11/2000 | Sasakura et al. | |
|---|---|---|---|---|
| 2002/0094784 | A1 | 7/2002 | Kashu et al. | |
| 2004/0097222 | A1* | 5/2004 | Kake et al. | 455/420 |
| 2004/0110474 | A1* | 6/2004 | Yonekura et al. | 455/74 |
| 2004/0268004 | A1* | 12/2004 | Oakley | 710/303 |
| 2005/0032475 | A1* | 2/2005 | Mauney et al. | 455/41.2 |
| 2006/0010380 | A1* | 1/2006 | Matsuzawa et al. | 715/700 |

FOREIGN PATENT DOCUMENTS

| CN | 1242653 A | 1/2000 |
|---|---|---|
| CN | 1401082 | 3/2003 |
| CN | 1429003 A | 7/2003 |
| DE | 100 49 965 A1 | 5/2002 |
| DE | 100 62 378 A1 | 6/2002 |
| EP | 0 838 907 A2 | 4/1998 |
| EP | 1 164 555 A2 | 12/2001 |
| JP | 6-69883 | 3/1994 |
| JP | 2002-183866 | 6/2002 |
| JP | 2002-218542 | 8/2002 |
| JP | 2002-300651 | 10/2002 |

OTHER PUBLICATIONS

European Search Report dated Sep. 30, 2005.
The People's Republic of China Office Action dated Feb. 24, 2006 (w/English translation of same).

* cited by examiner

Primary Examiner—CongVan Tran
(74) Attorney, Agent, or Firm—Dickstein, Shapiro, LLP.

(57) ABSTRACT

The mobile communication terminal has a main body unit and an attachment. When the main body unit separates from the attachment, the attachment transmits a predetermined radio signal. The main body unit receives the radio signal and determines whether its distance from the attachment exceeds specified distance. When the main body unit is at a distance from the attachment exceeding the specified distance, predetermined operation of the main body unit, for example, entering operation using a keypad, memory read-out operation, data transmission and data reception, are disabled. In this manner, it is possible to prevent unauthorized use by third parties or information leaks to third parties when the main body unit has been lost.

17 Claims, 5 Drawing Sheets

MOBILE COMMUNICATION TERMINAL

BACKGROUND OF THE INVENTION

1. Field of the Invention

The present invention relates to a mobile communication terminal and to a mobile communication terminal capable of preventing loss, theft or unauthorized use of the mobile communication terminal in particular.

2. Description of the Related Art

With the diffusion of the mobile phone, the loss or theft thereof has become a major problem. When a mobile phone has been lost there is a risk that a third party may use the mobile phone without permission or that information contained therein may leak out.

A large number of mobile communication terminals provided with a protection function against unauthorized use has already been proposed. Patent Laid-Open 2004-69883, Patent Laid-Open 2002-218542 and Patent Laid-Open 2002-183866 disclose a warning device that separates from the phone. The warning device receives a weak radio signal transmitted by the mobile phone. When the receiving signal level has dropped and reception is disabled, the warning device generates the previously set warning. With these technologies, however, the warning devices only gives a warning and is, consequently, not capable of preventing unauthorized use after loss or theft. Patent Laid-Open 2002-300651 discloses a protection system for preventing the unauthorized use of a portable information terminal by using a wristwatch. The wristwatch and the portable information terminal mutually conduct short-distance wireless communication. When the portable information terminal cannot receive the transmission packet that is regularly sent from the wristwatch, the portable information terminal will not operate without entering the previously registered password or fingerprint. In this system, it is necessary to enter the previous settings for user verification and the use needs to carry both the special-purpose wristwatch and the portable information terminal.

SUMMARY OF THE INVENTION

The present invention provides a mobile communication terminal with a main body unit having a radio unit and an attachment that is detachable from the main body unit. The main body unit has a first receiver for receiving a radio signal sent from the attachment, a determination section for determining whether the distance of the main body unit to the attachment exceeds specified distance or not, and a controller for disabling predetermined operation of the main body unit. The attachment has a first transmitter for transmitting the radio signal. The controller is capable of disabling the predetermined operation when distance between the main body unit and the attachment exceeds the specified distance.

In another mobile communication terminal according to the invention, the main body unit has a second transmitter that transmits a predetermined radio signals, and the attachment has a secondary receiver that receives the predetermined radio signals sent from the second transmitter. The second transmitter transmits a predetermined radio signal regardless of disablement of the predetermined operation when distance between the main body unit and the attachment exceeds the specified distance.

In the above mobile communication terminal according to the invention, the predetermined various operations of the main body unit are automatically disabled when the main body unit separates from the attachment by a distance exceeding the specified distance. As a result, unauthorized use by third parties cannot take place and information will not leak out even when the main body unit is lost.

BRIEF DESCRIPTION OF THE DRAWINGS

The above and other objects, features and advantages of the present invention will become apparent from the following detailed description when taken with the accompanying drawings in which.

DETAILED DESCRIPTION OF THE PREFERRED EMBODIMENTS

Figure 1:
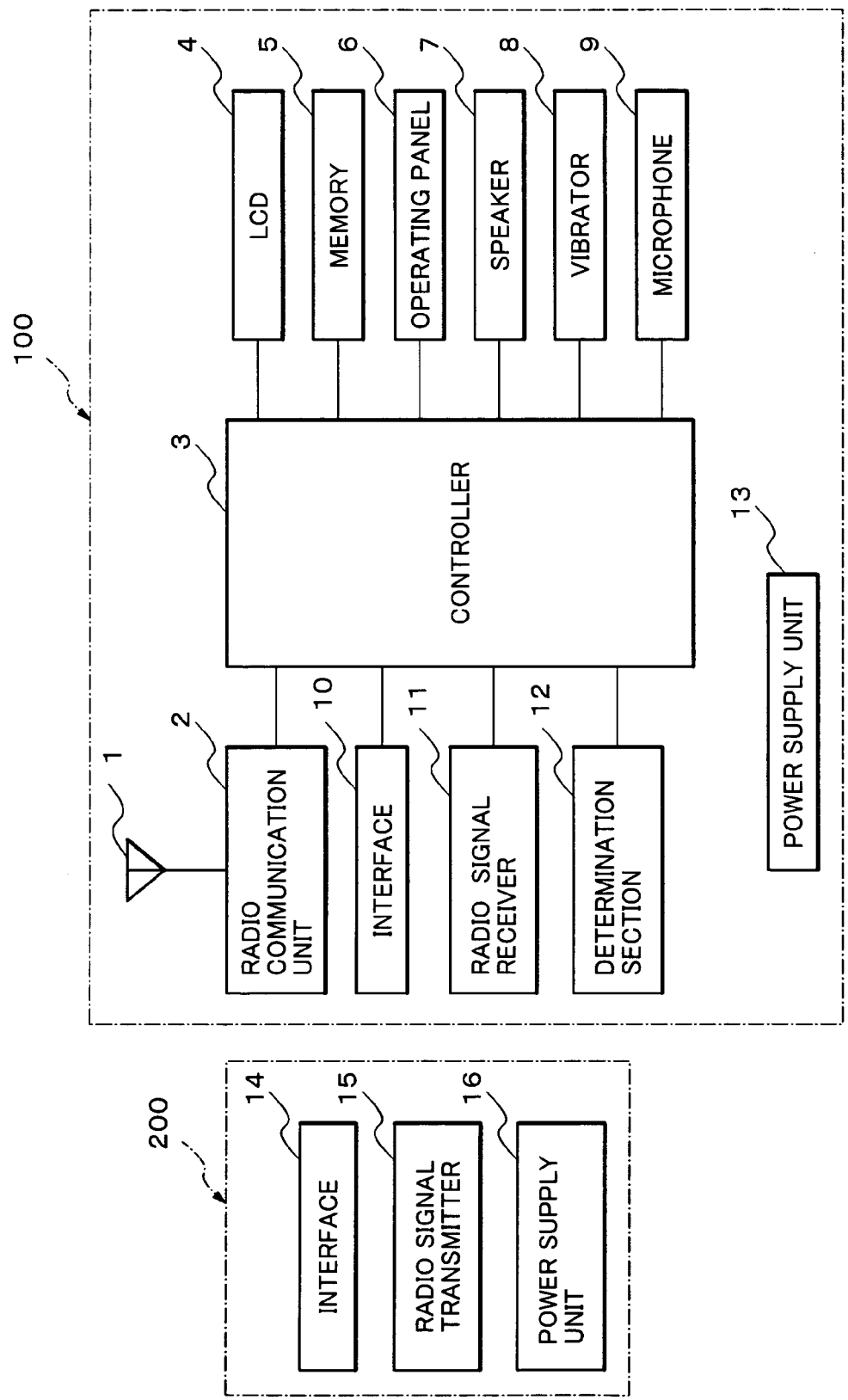
FIG. 1 is a block schematic of an embodiment of the mobile communication terminal according to the present invention.

The following describes a portable telephone as preferred embodiment of the mobile communication terminal. Referring to FIG. 1, a mobile communication terminal has a main body unit 100 and an attachment 200. The attachment 200 is detachable from the main body unit 100. The attachment 200 and the main body unit 100 are provided with connectors (not shown in the drawings) for connecting them. Similarly to an ordinary mobile phone, the main body unit 100 has an antenna 1, a radio unit 2, a controller 3 with a built-in CPU, a liquid crystal display 4 (referred to as LCD4 hereafter), a memory 5, an operating unit 6 with a keyboard, a speaker 7, a vibrator 8 with a vibration motor, and a microphone 9. The controller 3 controls the various functions of the main body unit 100. In addition, it has a mail transmitting and receiving function and an Internet browser function.

The main body unit 100 has an interface 10 for the attachment 200 and a radio signal receiver 11 capable of receiving a radio signal sent from the attachment 200 within a short distance range. The main body unit 100 has a determination section 12. The determination section 12 determines, on the basis of the radio signal received by the receiver 11, whether or not the main body unit 100 is located at a distance exceeding predetermined distance from the attachment 200. When the received radio signal has lower reception field intensity than pre-set field intensity, the determination section 12 determines that the main body unit 100 and the attachment part 200 are located at a distance in excess of the predetermined distance. The controller 3 is provided with a function disabling various operations of the main body unit 100 in accordance with determination made by the determination section 12. The operations that can be disabled include, for example, the entering operation using the keypad, memory read-out operation, call transmission, call reception, transmission of an e-mail, and reception of an e-mail, and access to external networks such as the Internet. A user can previously select and set the operations of the main body unit 100 to be disabled. The disabled operations on the main body unit 100 can be enabled again by connecting the main body unit 100 with the attachment 200. Based on the above determination, the controller 3 can conduct at least one of generating a warning on the LCD4, causing an acoustic alarm from the speaker 7, and starting the vibrator 8. The user can set at least one of these operations. Similarly, the controller 3 is capable of conducting at least one of sending a predetermined e-mail and making a call to a predetermined third party when the distance between the main body unit 100 and the attachment part 200 exceeds the predetermined distance. The above warning operations, e-mail sending and calling can be executed before these pre-selected operations are disabled regardless of disablement by the controller 3. The text of the transmitted e-mail and/or the calling is previously stored in the memory 5. The interface 10 is provided with a detection function for detecting whether or not the main body unit 100 and the attachment part 200 are connected.

The attachment 200 can be connected to the main body unit 100 via a connector (not shown in the drawings). The attachment 200 may also take the form of a memory card that can be inserted into and detached from a main body unit case. The attachment 200 is provided with an interface 14 to the main body unit 100 and a radio signal transmitter 15 that transmits a radio signal within a short distance range. The transmitter 15 will normally send a radio signal when the main body unit 100 separates from the attachment 200. The transmitter 15 may transmit a radio signal in accordance with such protocols as Bluetooth or wireless LAN (e.g., IEEE802.11 High-Rate Direct Sequence). Alternatively, the transmitter 15 may send a radio signal by using infrared communication technology.

The attachment part 200 is equipped with a power unit 16. This power unit 16 turns OFF when the attachment part 200 is connected to the main body unit 100. The power unit 16 turns ON when the main body unit 100 is separate from the attachment part 200. Then the transmitter 15 starts the transmission of the above radio signal. When the main body unit 100 is connected to the attachment 200, transmission of the radio signal can be interrupted while the power unit 16 remains ON. When the main body unit 100 is connected to the attachment 200, ON/OFF at the power unit 16 of the attachment part 200 are coupled with ON/OFF at a power source of the main body unit 100. The power source can turn ON in accordance with a predefined setting only when the main body unit 100 separates from the attachment 200. The radio communication unit 2 is capable of executing a function of the radio signal receiver 11 by adjusting a reception conditions.

Figure 2:
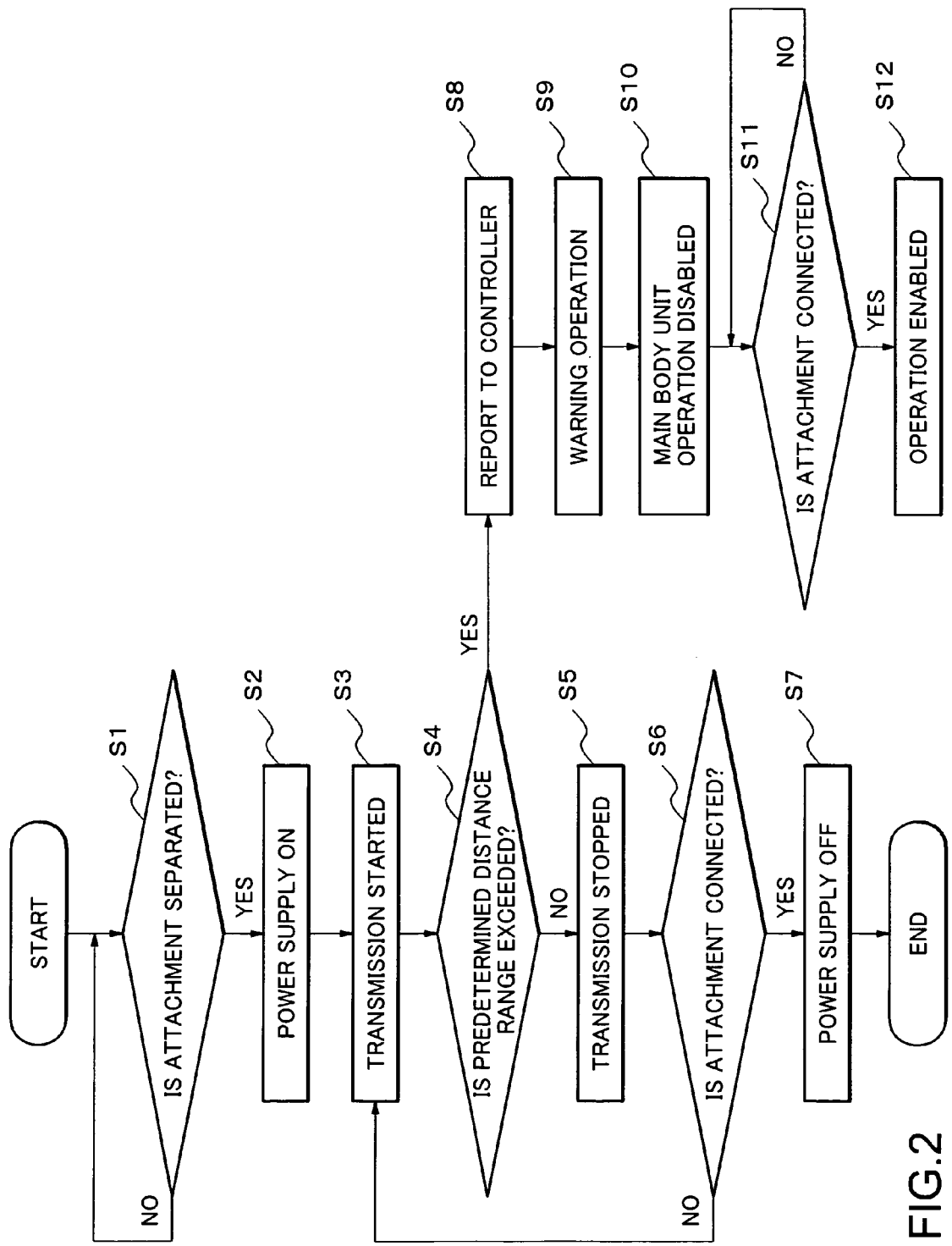
FIG. 2 is a flow chart of an operational embodiment of the mobile communication terminal.

FIG. 2 shows an embodiment of operation in the above portable telephone. First, the interfaces 10 and 14 determine whether or not the main body unit 100 separates from the attachment part 200 (S1). Thus, for example, the determination may be made on the basis of a change in level (H or L). When the main body unit 100 separates from the attachment 200 (S1: YES), the power unit 16 of the attachment 200 turns ON (S2). Next, the radio signal transmitter 15 of the attachment 200 starts transmitting a radio signal (S3). The radio signal receiver 11 of the main body unit 100 receives the radio signal. The determination section 12 determines, on the basis of the radio signal received, whether the main body unit 100 is located within the predetermined distance range from the attachment part 200 (S4: NO) or whether the unit 100 is located beyond this predetermined distance range (S4: YES). When it has determined that the main body unit 100 is located within the predetermined distance range, the transmitter 15 temporarily stop transmitting the radio signal (S5). Following this, it is determined whether or not the main body unit 100 is connected with the attachment 200 (S6). When the unit 100 is not connected to the attachment 200 (S6: NO), the transmitter 15 starts transmitting the radio signal. When the main body unit 100 is connected to the attachment part 200 (S6: YES), the power unit 16 of the attachment 200 turns OFF.

When, in the step S4, the main body unit 100 is recognized as being outside the predetermined distance range (S4: YES), the determination section 12 of the main body unit 100 reports the result to the controller 3 (S8). The controller 3 then executes at least one warning operation of displaying alarm on the LCD4, generating sound from the speaker 7, and vibration of the vibrator 8. The controller 3 then disables predetermined operations on the main body unit 100 (S10). The step S10 may take place prior to the step S9. When, after this, the main body unit 100 is recognized as having been connected to the attachment 200 (S11: YES), the controller 3 enables the operation that has been disabled. The step S12 may take place prior to the step S11.

Figure 3:
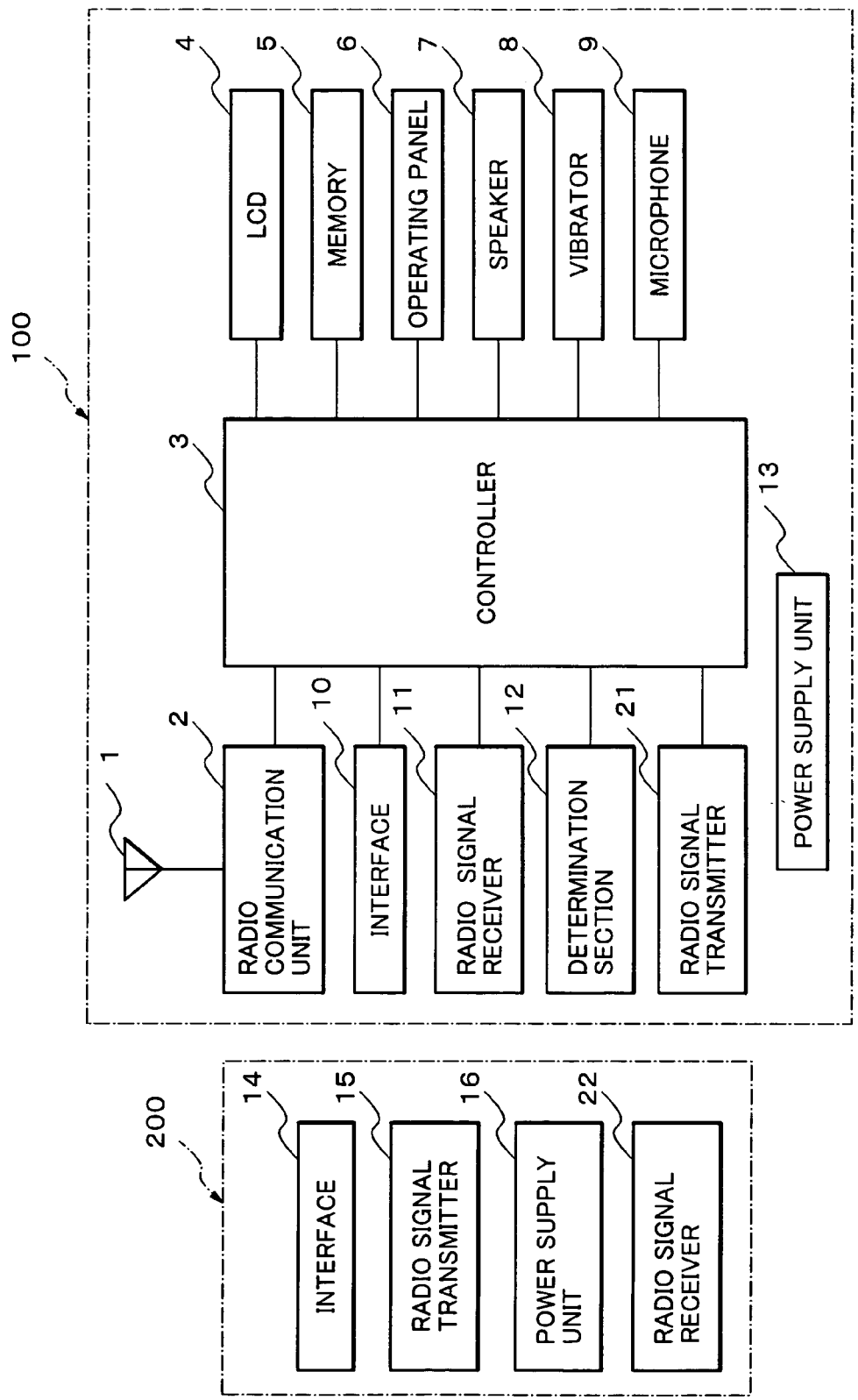
FIG. 3 is a block schematic of another embodiment of the mobile communication terminal according to this invention.

FIG. 3 shows another embodiment of the mobile communication terminal according to the invention. The mobile communication terminal according to this embodiment has essentially the same configuration as shown in FIG. 1. In this embodiment, the main body unit 100 is provided with an additional radio signal transmitter 21 and the attachment 200 with an additional radio signal receiver 22. The radio signal transmitter 21 is capable of transmitting a predetermined radio signal, when the main body unit 100 is separated from the attachment 200 or when the main body unit 100 is separated from the attachment part farther than predetermined distance. The radio signal contains information about presence or absence of an incoming call to the main body unit 100, and about a caller. The radio signal receiver 22 in the attachment 200 receives the radio signal and the user is capable of recognizing the above information. The radio signal transmitter 21 is capable of transmitting the above radio signal before the controller 3 disables the predetermined operation or even though the predetermined operation has been disabled. The radio communication unit 2 is capable of executing the functions of the radio signal transmitter 21 by adjusting the transmission condition.

Figure 4:
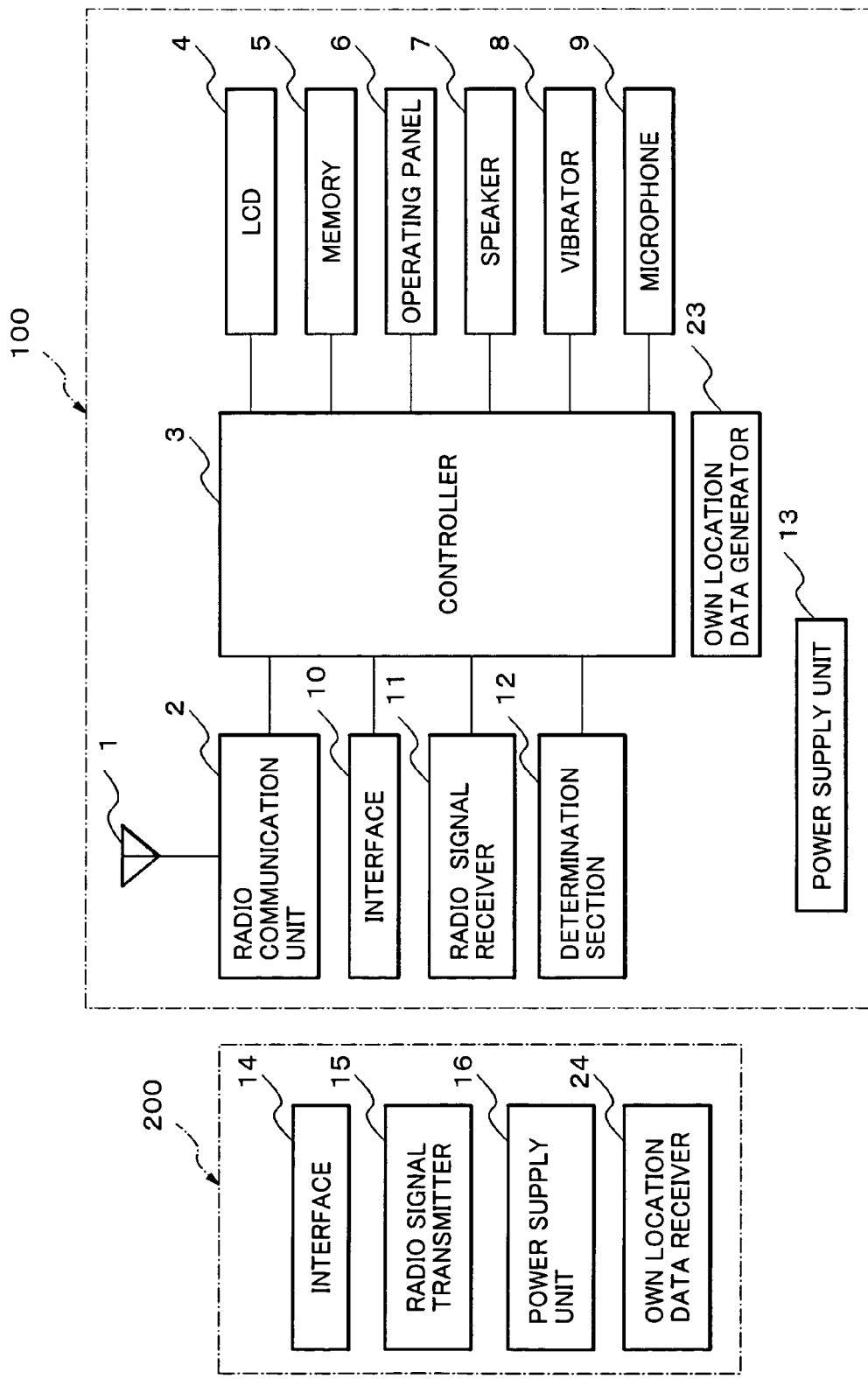
FIG. 4 is block schematic of yet another embodiment of the mobile communication terminal according to this invention.

FIG. 4 shows a portable telephone as yet another embodiment of the mobile communication terminal according to the present invention. It has essentially the same configuration as shown in FIG. 1. In this embodiment, the main body unit 100 is further provided with an own location data generator 23. When the main body unit 100 is separated from the attachment 200, the own location data generator 23 generates data about its own position by using a global positioning system (GPS) or the radio wave strengths of various base stations. The own position data is transmitted at certain intervals by the radio communication unit 2. The attachment 200 which is equipped with an own location data receiver 24, or a specific terminal receives the data so that the user can recognize the present location of the main body unit 100. The radio communication unit 2 transmits the own position data even when certain predetermined operation have been disabled by the controller 3.

Figure 5:
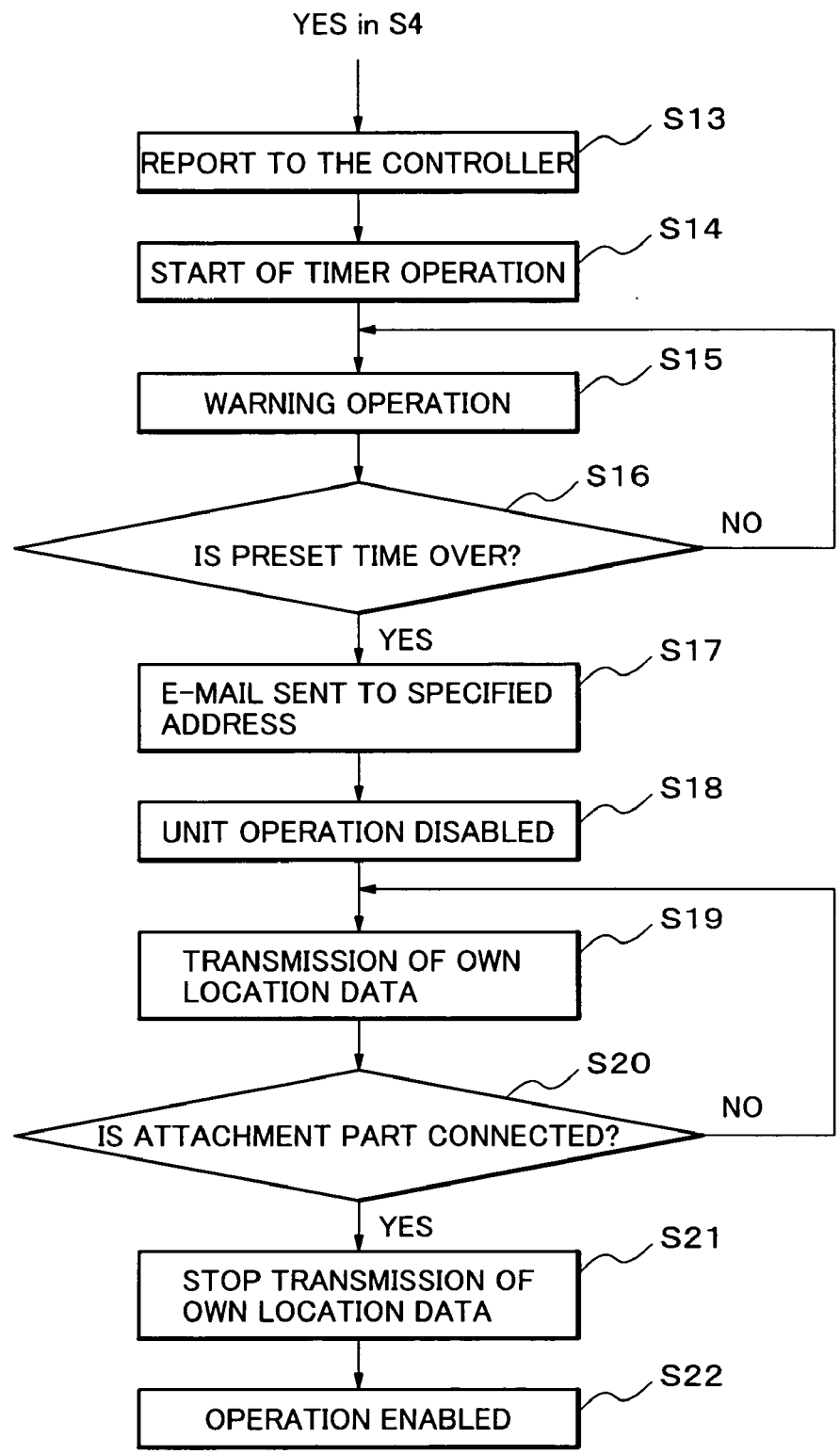
FIG. 5 is a flow chart of another operational embodiment of the mobile communication terminal.

FIG. 5 shows a further embodiment of the mobile communication terminal. When the main body unit 100 has been recognized as being located outside the predetermined distance range (S4: YES), the determination section 12 of the main body unit 100 reports the determination result to the controller 3 (S13). On receipt of this message, the controller 3 starts a timer (S14) and executes at least one of displaying alarm on LCD4, generating sound from the speaker 7, and starting the vibrator 8. The controller 3 determines whether the preset time has elapsed or not (S16). When the preset time is over (S16: YES), the controller 3 automatically transmits an e-mail to a preset specified address (S17). In conjunction with the transmission of the e-mail, or instead of the e-mail, it is also possible to make a telephone call to the specified address. Next, the controller 3 disables the predetermined operation of the main body unit 100 (S18). The step S18 may take place prior to the step S17. The controller 3 starts the own location data generator 23 to transmit at predetermined intervals through the radio communication unit 2 the radio wave signal that report the own location data (S19). In this manner, it is possible to trace the location of the main body unit 100 even though the unit 100 has been lost or stolen. When the main body unit 100 is connected to the attachment part 200 (S20: YES), the controller 3 stops transmitting own location data (S21) and the disabled operation is enabled (S22). Apart from the operational function shown in FIG. 2 and FIG. 5, it is possible to combine various functions to prevent unauthorized use and warn of loss in the event that the main body unit 100 and the attachment 200 are farther apart from each other than the specified distance.

While the present invention has been described in connection with certain preferred embodiments, it is to be understood that the subject matter encompassed by the present invention is not limited to those specific embodiments. On the contrary, it is intended to include all alternatives, modifications and equivalents as can be included within the spirit and scope of the following claims.

What is claimed is:

1. A mobile communication terminal comprising: a main body unit having a radio unit; and an attachment that is detachable from the main body unit, wherein the main body unit comprises a first receiver for receiving a radio signal sent from the attachment, a determination section for determining whether or not the distance of the main body unit to the attachment exceeds specified distance, and a controller for disabling predetermined operation of the main body unit in accordance with a result of the determination section, and wherein the attachment comprises a first transmitter for transmitting the radio signal,
   wherein the controller performs at least one of sending a predetermined e-mail and making a phone call to a predetermined party regardless of disablement of the predetermined operation, when the distance between the main body unit and the attachment exceeds the predetermined distance.

2. The mobile communication terminal of claim 1, wherein the controller disables the predetermined operation on receipt of notice from the determination section when the distance of the main body unit to the attachment exceeds the predetermined distance.

3. The mobile communication terminal of claim 1, wherein the determination section determines the predetermined distance on the basis of received electric field intensity of the radio signal.

4. The mobile communication terminal of claim 1, wherein the first transmitter stops transmitting the radio signal when the main body unit connects to the attachment.

5. The mobile communication terminal of claim 1, wherein the predetermined operation to be disabled is at least one of entering operation using a keypad located on the main body unit, memory read-out operation, data transmission and data reception.

6. The mobile communication terminal of claim 1, wherein the main body unit comprises at least one of a display, a speaker and a vibrator, and the controller performs at least one of warning indication on the display, sound generation from the speaker and starting the vibrator when the distance between the main body unit and the attachment exceeds the predetermined distance.

7. The mobile communication terminal of claim 1, wherein the first receiver is the radio unit.

8. The mobile communication terminal of claim 1, wherein the main body unit comprises a second transmitter for transmitting a predetermined radio signal, the attachment comprises a second receiver for receiving the predetermined radio signal, and wherein the second transmitter transmits the predetermined radio signal regardless of disablement of the predetermined operation.

9. The mobile communication terminal of claim 8, wherein the predetermined radio signal transmitted from the second transmitter has information about an incoming call to the main body unit.

10. The mobile communication terminal of claim 8, wherein the second transmitter transmits the predetermined signal when the distance of the main body unit to the attachment exceeds the predetermined distance.

11. The mobile communication terminal of claim 8, wherein the second transmitter stops transmitting the predetermined signal in case that the main body unit connects to the attachment.

12. The mobile communication terminal of claim 8, wherein the second transmitter is the radio unit.

13. The mobile communication terminal of claim 1, wherein the main body unit has an own location informing section for forming information on the own location, and the radio unit transmits the information on the own location regardless of disablement of the predetermined operation.

14. The mobile communication terminal of claim 13, wherein the attachment has a receiver for receiving the information on the own location of the main body unit.

15. The mobile communication terminal of claim 13, the radio unit transmits the information on the own location of the main body unit when the distance of the main body unit to the attachment exceeds the predetermined distance.

16. The mobile communication terminal of claim 13, wherein the radio unit stops transmitting the information on the own location of the main body unit in case that the main body unit connects to the attachment.

17. The mobile communication terminal of claim 2, wherein the disabled predetermined operation is enabled by connecting the main body unit to the attachment.

* * * * *